3,361,627
PHENOTHIAZINE COMPOSITIONS
Walter R. Campbell, Milwaukee, Wis., assignor to Harris Trust and Savings Bank, Chicago, Ill., a banking corporation of Illinois
No Drawing. Filed June 20, 1958, Ser. No. 743,476
10 Claims. (Cl. 167—53)

This invention relates to improvements in veterinary medicines and particularly to an anthelmintic for ruminant livestock.

Livestock are subject to a number of pathogenic helminths or worms (sheep being subject to over 25 different kinds of worms) which are responsible for various animal diseases, general debility and poor growth, and poor breeding and reproduction. Such worms have a life cycle (see B. Schwartz and H. W. Vegors, The Scientific Monthly, May 1957, pp. 229–36), which includes a parasitic life portion within the animal and a developmental life portion on forage from which the larvae are ingested. If an adequate anthelmintic is used, both worms and their eggs are dead when discharged from animals or are in a form from which they are not able to develop sufficiently to resist atmospheric conditions. Hence, use of an effective anthelmintic has both the effect of improving growth and reproductivity of animals treated and of reducing infestation of pastures.

All anthelmintics are poisonous to some extent and should therefore be administered in doses which are less toxic to animals and less likely to produce poisoning or even undesirable side reactions. Phenothiazine has long been used as an anthelmintic (see Veterinary Toxicology by Garner, published Balliere, Tindol and Cox, 1957) in dosages up to 100 grams at one time dependent on the size and kind of animal. Phenothiazine is almost insoluble in water and a large part of the dosage as heretofore administered (see T. Ellison and A. C. Todd, American Journ. Vet. Research, July 1957, pp. 519–529) passes through the animal unchanged. But, even so, there is danger of poisoning and particularly danger to weaker animals. Phenothiazine was heretofore usually administered as a drench or in capsule, or bolus form, as attempts to feed suspensions or emulsions of phenothiazine have not been successful.

Even though phenothiazine is almost insoluble in water and therefore largely wasted, it has been found that even healthy animals are subject to undesirable but short range side reactions which include increased blood pressure and rise in body temperature, when massive doses are used. However, more important long range side reactions include constipation, weakness in hind quarters and coma, and in some instances result in photo-sensitive keratitis, enlarged kidneys and hemolytic anemia. The action of phenothiazine is highly variable dependent on individual animals and, when animals are already debilitated or weakened, the side reactions become more severe. Hence, the administration of phenothiazine to an entire flock of sheep may cause the death of some animals unless fed in relatively small dosages and over several days' time.

Heretofore, phenothiazine has also been used as a paste or as a coating on inert material dispersed or suspended in water or as dispersions or suspensions in water, with various wetting agents or surface tension depressing agents. However, even when phenothiazine and a wetting agent are ground together, it has been necessary to provide dispersants or stabilizers and the suspensions have had to be carefully handled and stored to avoid breaking the suspension.

Even when such suspensions remained fluid, there was sufficient non-uniformity therein to make it difficult for the user to determine the exact dosage being administered. In all such suspensions the use of dispersants, wetting agents and the like, introduced material which added to the highly individual action of the phenothiazine itself in complicating its use. Hence, even though phenothiazine is one of the best anthelmintics known, its true pharmacological effect was not achieved because no solvent had been heretofore found which allows feeding of the drug and in accurate dosages and in a full effective form.

If phenothiazine is completely dissolved in a material miscible with water and which is miscible with other materials such as preservatives, flavors and the like, it is possible to administer a diluted solution by way of drinking water or on feed. Such solution allows reduction of dosages far below the danger point for even debilitated or weakened animals while securing the desired effect due to the regular ingestion of small doses over a length of time which minimizes the toxic effects in all animals. Any solvent for phenothiazine to be used in veterinary medicine should of course be non-toxic and nearly tasteless in diluted form, should be completely miscible with water and should be compatible with an edible preservative such as propylene glycol, also miscible in water. All dosage materials other than phenothiazine should be substantially inert to or assimilable by the animal. With such solvent it is possible to administer phenothiazine in solution and in repeated small doses offered over a period of time, thus avoiding undesirable side reactions otherwise occurring in most animals treated, and making unnecessary the segregation of weaker animals.

I have found that phenothiazine N.F. can be readily dissolved in "Tween 80" or in "Tween 40" which are respectively a polyoxyethylene derivative of sorbitan monooleate and a monopalmitate. Tween 80 is preferred because of its higher solubilizing power as 2–3 grams more of Tween 40 is required to dissolve the same amount of phenothiazine. Tween 80 is bitter to human taste, neutral, non-toxic and completely miscible in water and has long been used in food for humans. When prepared according to my method, the phenothiazine is completely dissolved and remains in solution for a satisfactory time (adequate shelf-life) without formation of a precipitate. Even if the solution is exposed to air and is partially oxidized to phenothiazone, there is no substantial precipitate and the solution remains an effective anthelmintic.

Polyoxyethylene sorbitan monolaurate (Tween 20) and liquid polyoxyethylene sorbitan monostearate (Tween 60) are also solvents for phenothiazine but are required in the proportions of 54 parts per gram of phenothiazine and therefore do not give a sufficiently concentrated solution at a cost comparable to that obtained with polyoxyethylene sorbitan monooleate and monopalmitate. Further, the above solvents do not permit substitution for dilution with water without precipitation of some of the phenothiazine.

A formulation which has been found practical for use as a stock-raisers' concentrate comprises:

| | Gms. |
|---|---|
| Phenothiazine (N.F. 2% impurities) | 1 |
| Solvent (polyoxyethylene sorbitan fatty acid ester) | 25-30 |
| Preservative (propylene glycol), up to 1 oz. | |

The preservative is an optional ingredient, dependent on the method of administration and on the length of time required for use of a container after it has been opened. The amount of solvent used depends on the grade of phenothiazine available, the N.F. grade requiring less solvent to produce a complete solution which remains stable and free from precipitates when diluted, than the purified grade. For administration of the above, any volume of water can be added without precipitation from the solution. At the highest amounts of the solvent, dilution with up to six volumes of water does not cause precipitation upon standing for up to 90 days. In such dilution, the drug freezes only to a semi-solid condition at temperatures as low as 0° C. and returns to a clear solution free from precipitates when brought to room temperature.

In preparation, the phenothiazine N.F. of commerce is ground to an impalpable powder. Sufficient Tweens 80 (sp. g. 1.1) is added per gram of phenothiazine to make a light slurry when thoroughly but gently mixed with the powder, the mixing being a spreading and folding together by use of a spatula or the like rather than a beating by a rotary stirrer. The phenothiazine particles break down mechanically during the "folding" action as the particles of phenothiazine are wetted by the solvent, the finer particles going into solution relatively quickly and the larger particles being subdivided progressively until all the material is in solution. The amount of solvent used during the "folding" step is more for purified phenothiazine than for the N.F. grade but the amount of solvent used initially is not critical and is determined only by the compounder's convenience. The length of time required for the initial breakdown and dissolving action is also less for the N.F. grade than for the purified grade but is of the order of five to eight minutes per gm. regardless of the grade of material used. The initial step is completed when the change in color shade of the phenothiazine shows that all particles are thoroughly saturated with the solvent and the material goes into solution thereafter even if the "folding" action is terminated. Thereafter, the balance of the solvent is added (per gram) and mixed gently (to minimize oxygen inclusion) and the mixture is then allowed to stand with occasional agitation until no more particles of phenothiazine are visible.

Sunlight aids oxidation of phenothiazine in concentrated solution, to phenothiazone which is believed to have lesser anthelmintic effect than the original phenothiazine. There is however no indication of oxidation in the diluted form, and the solution may therefore be now diluted with water to any desired concentration. The final solution is preferably handled in corrosion resisting containers.

The solution has a slightly rancid and bitter taste (to humans) and a slight burning after-taste. Hence, a flavoring such as molasses may be added (at the point of use) to overcome the bitterness and burning sensation when the material is fed. Any flavor completely miscible in water and any quantity thereof may be used but molasses has the advantage of promoting adhesion when the solution is sprinkled on feed. When placed in the drinking water, any of the solution with molasses adhering to the water container is eagerly licked off by the animals. The flavor is added by the stock-raiser at the time of final dilution for feeding purposes and may be used in any amount found most palatable to the animals. It is desired that the solution be added to the feed or water immediately before feeding to reduce the possibilities of loss by drying or spillage.

Feeding tests have been made with the present solution by organizations well known for their work in animal husbandry and by private raisers of stock in large numbers. As an example, one feeding test utilizing a total of 60 grams phenothiazine per animal in the 1:25 formulation above was fed over four days' time in drinking water and the results were as follows:

| Animal lot No. | Pre-treatment count eggs per 5 gms. feces | Post-treatment count —1 day after | Percent reduction |
|---|---|---|---|
| 1 | 19,780 | 778 | 96.06 |
| 2 | 22,101 | 2,252 | 89.11 |
| | | Post-treatment count—2 days after | |
| | | 891 | 95.49 |
| | | 2,256 | 89.79 |

The animals were not on a restricted water intake prior to test so that there were no conditions tending to force drinking during the test. There were no indications of unusual thirst (fever) either during or after the test. Also, there were no indications of rise in blood pressure or of reduced rate of feeding which indicates other undesirable reactions or permanent effects.

The present composition is a "brilliant" wholly transparent solution as compared to prior emulsions and suspensions and complete solubility is retained under any usual conditions of handling and storing. The solvent and preservative are compounds known to be edible and are inert to the phenothiazine and to the animals. The present solution can be diluted as far as desired without precipitation and is not affected by sunlight or the usual storage conditions when in its diluted form. Because all of the phenothiazine is in effective form and can be fed in accurate and small dosage, the danger of poisoning weak animals or of producing undesirable side reactions in healthy animals, is greatly reduced, if not eliminated. The effectiveness of relatively small dosages has been demonstrated both in the hands of persons experimenting in animal husbandry and in the hands of the usual stock-raisers.

I claim:

1. A composition consisting essentially of phenothiazine dissolved in a polyoxyethylene sorbitan higher fatty acid ester, the phenothiazine being present in such quantity that it remains in solution when said composition is added to an aqueous medium.

2. A composition as claimed in claim 1 consisting essentially of one gram by weight of phenothiazine dissolved in about 25-30 grams by weight of a polyoxyethylene sorbitan higher fatty acid ester.

3. A composition consisting essentially of phenothiazine dissolved in a polyoxyethylene derivative of a sorbitan ester selected from the group consisting of the monooleate, monopalmitate, monolaurate and monostearate, the phenothiazine being present in such quantity that it remains in solution when said composition is added to an aqueous medium.

4. A composition as claimed in claim 3 wherein the sorbitan ester is the monooleate.

5. A composition comprising phenothiazine and a polyoxyethlene sorbitan higher fatty acid ester, the phenothiazine being present in such quantity that it remains in solution when said composition is added to an aqueous medium.

6. A composition as claimed in claim 5 wherein the quantity of said phenothiazine is approximately 1 gram per 25-30 grams of said polyoxyethylene sorbitan higher fatty acid ester.

7. A composition as claimed in claim 5 containing propylene glycol as an edible preservative in an amount up to about one ounce per gram of phenothiazine.

8. A composition comprising phenothiazine and polyoxyethylene sorbitan monooleate, the phenothiazine being present in such quantity that it remains in solution when said composition is added to an aqueous medium.

9. A composition as claimed in claim 8 comprising about 1 gram by weight phenothiazine for each 25–30 grams by weight of said polyoxyethylene sorbitan monooleate, and up to about one ounce of propylene glycol for each gram of phenothiazine.

10. A composition comprising phenothiazine and polyoxyethylene sorbitan monopalmitate, the phenothiazine being present in such quantity that it remains in solution when said composition is added to an aqueous medium.

References Cited

UNITED STATES PATENTS 2,294,888  9/1942  Austin _____ 167—53

OTHER REFERENCES

Stoklosa: J.A.P.A. (pract. ed.), January 1951, vol. 12, No. 1, pp. 23–25.

Barr: J.A.P.A., vol. 46, No. 7, July 1957, pp. 442–445.

SAM ROSEN, *Primary Examiner.*

M. O. WOLK, W. B. KNIGHT, *Examiners.*